United States Patent [19]
Bauer et al.

[11] 3,862,292
[45] Jan. 21, 1975

[54] RECOVERY OF RHENIUM

[75] Inventors: Donald J. Bauer; Dennis D. Fischer; Roald E. Lindstrom, all of Reno, Nev.

[73] Assignee: The United States of America as represented by the Secretary of the Interior, Washington, D.C.

[22] Filed: Aug. 24, 1973

[21] Appl. No.: 386,792

[52] U.S. Cl. ............ 423/49, 423/54, 75/101 BE;108
[51] Int. Cl. ............................................ C01g 47/00
[58] Field of Search ..................... 423/49, 54, 658.5; 75/101 BE; 210/39, 40

[56] References Cited
UNITED STATES PATENTS
3,558,268  1/1971  Prater et al. .......................... 423/49
FOREIGN PATENTS OR APPLICATIONS
163,359  12/1964  U.S.S.R. ............................... 423/49

Primary Examiner—Herbert T. Carter
Attorney, Agent, or Firm—William S. Brown; Frank A. Lukasik

[57] ABSTRACT

Rhenium is recovered from solution by adsorption on activated carbon, followed by elution with a water-soluble alcohol or an alcohol-water mixture.

8 Claims, No Drawings

RECOVERY OF RHENIUM

Rhenium is conventionally obtained as a by-product from treatment of porphyry copper ores. It is contained in by-product molybdenite concentrates from porphyry copper operations, and is recovered by processing rhenium-bearing fumes and dusts from roasting of the molybdenite concentrate. Water leaching of the molybdenite roaster flue dust dissolves a major amount, e.g., about 85 percent, of the rhenium, as perrhenates. In addition, substantially greater amounts of molybdenum and minor amounts of a variety of other metals are dissolved. This results in a solution generally having a pH of less than 1, and containing about 100 to 500 ppm of rhenium, 1 to 5 percent of molybdenum and up to about 0.1 percent of a variety of other metals such as copper, selenium, manganese, sodium, potassium, calcium, strontium, magnesium, etc. It will also contain about 0.1 to 5 percent of sulfate ion.

Recovery of rhenium from the resulting solutions has previously been accomplished by solvent extraction, ion exchange or selective adsorption of the rhenium on activated carbon. All of these procedures, however, suffer from difficulties in regeneration of the organic phase for recycle, or give poor separation of rhenium from other metals.

Where adsorption on activated carbon is employed, the rhenium is usually eluted from the carbon with perchlorate, thiocyanate or strong base aqueous solution. However, the perchlorate and thiocyanate are expensive and are difficult to remove from the carbon, thus making regeneration difficult. In addition, perchlorate is undesirable because of the danger of explosion. Strong base eluents are undesirable because further processing of such solutions is difficult.

It has now been found, according to the process of the invention, that rhenium may be recovered from activated carbon in high yield and purity by elution with a water-soluble alcohol, or a mixture of such an alcohol and water. In addition, the activated carbon is readily regenerated by means of a water wash.

It has also been found that elution with the alcohol or water-alcohol mixture is further enhanced by the presence of thiocyanate ion in the eluent mixture.

A still further aspect of the invention is the discovery that elution with a brine solution is effective for removal of entrained molybdate ion from the activated carbon prior to elution of the rhenium.

Granular activated carbon, suitable for use in the invention, is a widely available material that is used in various adsorption processes. Typically, it will have a total surface area of about 600–900 $M^2/g$, a particle size of about 0.15 to 2.0 mm, a density of about 15 to 30 lbs/ft$^3$, pore sizes ranging from about 10 to 20,000 A and a porosity of about 0.6 to 0.9 cc/g. Activation may be accomplished in a variety of conventional ways, e.g., by heating in a steam-air mixture at a temperature of about 850°C. The carbon may be derived from any of a variety of sources such as coal, petroleum chars, coconut shell or pulp mill black ash.

Adsorption of rhenium on the activated carbon is accomplished simply by contacting the rhenium-containing feed with the activated carbon for a time sufficient to permit adsorption of a major amount of the rhenium, usually greater than 98 percent of the rhenium in the feed. This may be accomplished by any conventional method for contacting liquids with solid sorbents. Generally, a fixed bed operation is most effective, particularly for larger scale operations. Such an operation typically employs a vertical columnar unit containing a bed of the sorbent particles in a closely packed and relatively fixed arrangement. The feed solution is introduced at the top of the column and flows downwardly through the absorbent bed at a rate that provides for adequate contact between solution and sorbent. Optimum flow rate of the feed solution through the adsorbent will depend on the type and concentration of ions in the solution, size and shape of the column and the size of the adsorbent particles, and is best determined empirically.

Where the concentration of molybdenum in the feed solution is high relative to that of the rhenium, e.g., about 10 to 300 times as great, substantial amounts of molybdate ion may be entrained on the activated carbon adsorbent during rhenium adsorbtion. In such cases, removal of a major proportion of the molybdenum prior to elution of the rhenium is desirable. It has been found that this may be accomplished by initially washing the adsorbent column with a brine solution consisting of an aqueous solution of sodium chloride or sodium chloride and sodium sulfate in a concentration of about 150 to 350 g/l. Again, the optimum amount and flow rate of the brine solution will depend on the above variables, particularly the relative amounts of molybdenum and rhenium, and is best determined empirically. This procedure has been found effective in removing essentially all of the molybdenum, with only a small loss of rhenium.

Rhenium is then eluted with a water-soluble alcohol or water-alcohol mixture. Suitable alcohols are methanol, ethanol, isopropanol and propanol. These may be employed alone or in water solution having a water content up to about 50 percent by weight. Again, the optimum amount and flow rate of the eluent will depend on the above variables and is best determined experimentally. Usually, however, the use of about 2 to 4 bed volumes of eluent is sufficient to substantially completely remove the rhenium from the column. In systems using a brine solution for removal of molybdate ion from the column, it is generally preferable to have some water in the eluent to prevent precipitation of the salt. The optimum amount of water will also depend on the subsequent processing.

It has been found that the elution is still further improved by inclusion of about 0.1 to 0.5 percent of thiocyanate ion in the eluent. This may be supplied by any soluble thiocyanate such as the sodium, potassium or ammonium salts. This results in a further improvement in rhenium elution efficiency.

Following rhenium elution, the adsorbent is regenerated simply by washing with water, the optimum amount of water again being dependent on the above-discussed variables. Generally, however, 2 to 4 bed volumes of water are sufficient to regenerate the activated carbon adsorbent.

Rhenium salts may be recovered from the eluate by conventional processes. E.g., the eluate may be boiled down to crystallize the rhenium in the form of perrhenate. Or, solvent extraction may be used to further purify the rhenium or to change the associated cation. E.g., following removal of the alcohol by boiling the eluate, the perrhenate ion may be extracted with a tertiary amine and then stripped with an ammonium hydroxide solution. The resulting ammonium perrhenate can be recovered in solid form by crystallization. Metallic rhenium may then be obtained from the salts, if desired, by reduction with hydrogen gas.

The invention will be more specifically illustrated by the following example.

EXAMPLE

An activated cocoanut carbon column 8 inches high and 1 inch in diameter was employed as adsorbent. Rhenium was initially absorbed onto the column from 1 liter of a 10 percent sodium chloride solution containing 1 gram per liter of rhenium in the form of sodium perrhenate, 10 grams per liter of molybdenum in the form of sodium molybdate and having a pH of 8.5.

The column was washed with 3 bed volumes of a 25 percent aqueous solution of sodium chloride, resulting in essentially complete removal of molybdenum and about 1 percent of the rhenium from the adsorbent.

Rhenium was then eluted with 4 bed volumes of a 25 percent water-75 percent methanol solution. 97 percent of the rhenium was thereby recovered from the column, 80 percent being recovered in the first 2 bed volumes.

The column was regenerated by washing with 4 bed volumes of water.

This procedure was repeated for 20 cycles with no substantial change in the adsorption, washing, elution or regeneration characteristics of the adsorbent column.

We claim:

1. A process for recovery of rhenium from aqueous solution comprising (1) contacting the solution with an adsorbent consisting essentially of activated carbon to selectively adsorb the rhenium and (2) eluting the adsorbed rhenium from the activated carbon by means of an eluent consisting essentially of a water-soluble alcohol or a mixture of a water-soluble alcohol and water.

2. The process of claim 1 in which the rhenium-containing feed solution also contains a substantial proportion of molybdenum.

3. The process of claim 1 in which the eluent is a water-soluble alcohol.

4. The process of claim 3 in which the alcohol is methanol or ethanol.

5. The process of claim 1 in which the eluent consists of a mixture of 10–40 percent water and 90–60 percent methanol.

6. The process of claim 1 in which the eluent additionally contains a water-soluble thiocyanate.

7. The process of claim 1 including the additional step of washing the column with a brine solution prior to elution in order to remove entrained molybdenum.

8. The process of claim 1 in which the column is regenerated following rhenium elution by washing with water.

* * * * *